Dec. 5, 1950  R. K. POTTER  2,532,731
VISUALIZATION OF COMPLEX WAVES
Filed Dec. 28, 1946  2 Sheets-Sheet 1
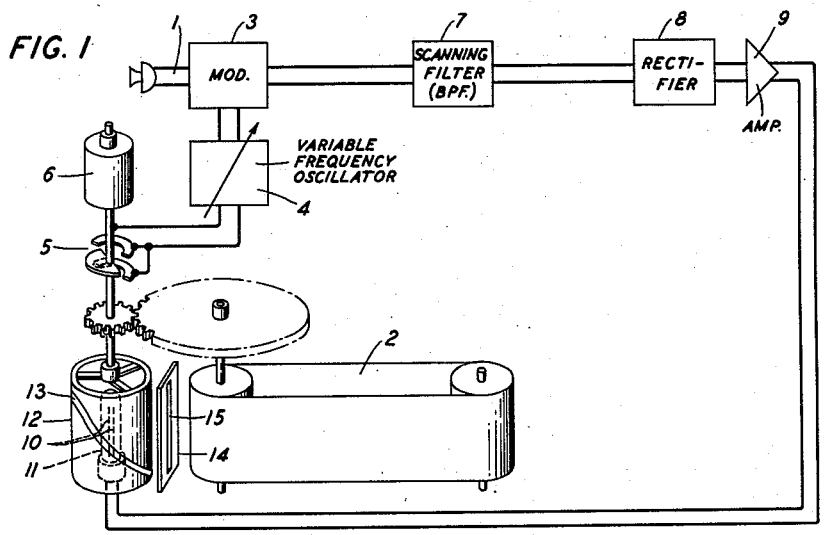
FIG. 1
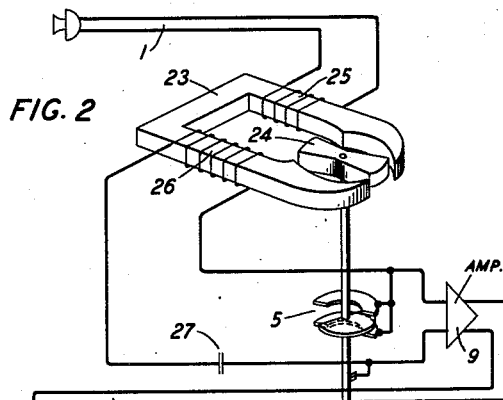
FIG. 2
FIG. 2A
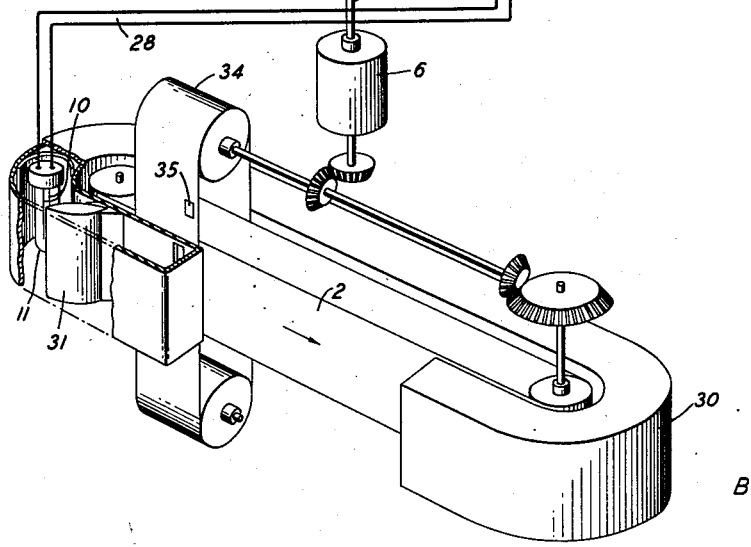
INVENTOR
R. K. POTTER
BY
*N. D. Ewing*
ATTORNEY Dec. 5, 1950         R. K. POTTER         2,532,731
VISUALIZATION OF COMPLEX WAVES
Filed Dec. 28, 1946                    2 Sheets-Sheet 2
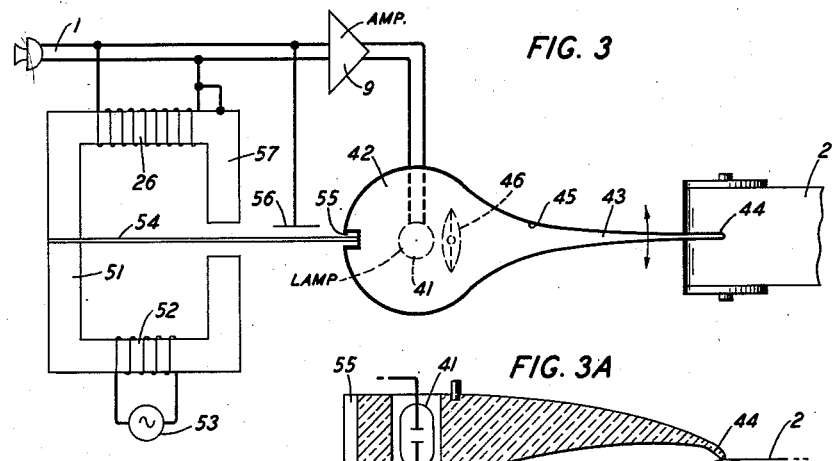
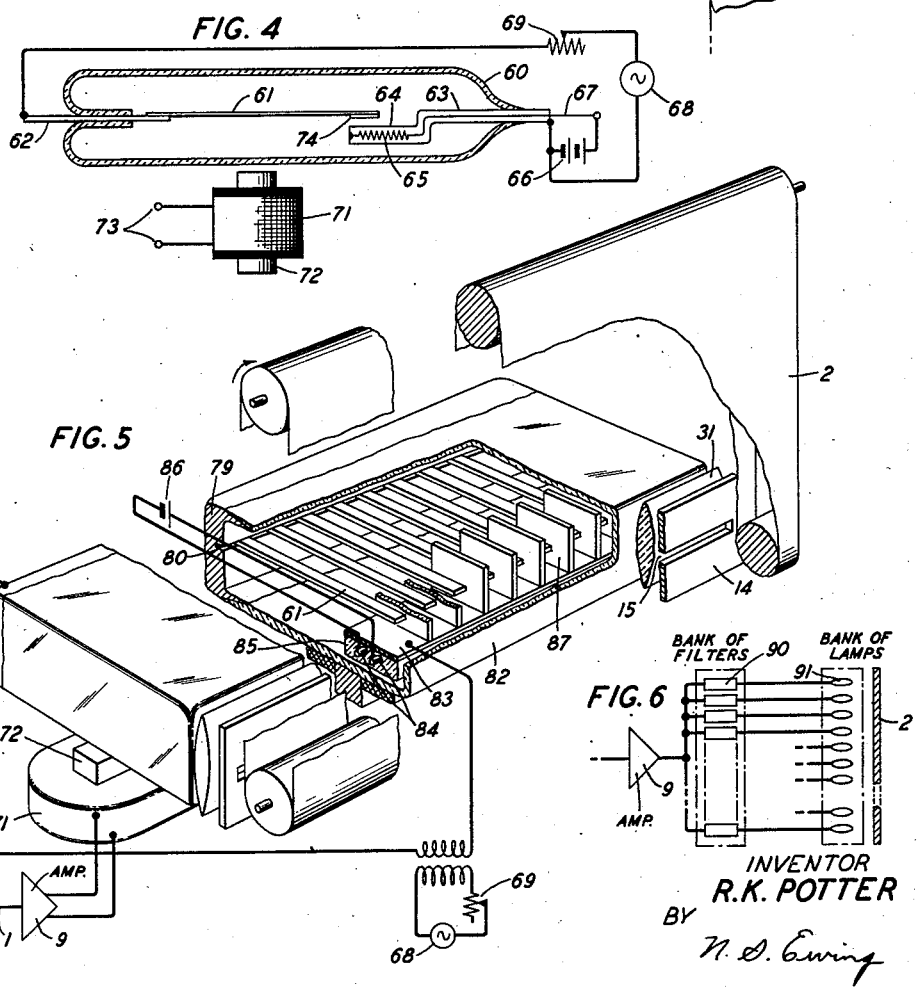
INVENTOR
R.K. POTTER
BY
N. D. Ewing
ATTORNEY Patented Dec. 5, 1950

2,532,731

UNITED STATES PATENT OFFICE 2,532,731

VISUALIZATION OF COMPLEX WAVES

Ralph K. Potter, Morristown, N. J., assignor to Bell Telephone Laboratories, Incorporated, New York, N. Y., a corporation of New York Application December 28, 1946, Serial No. 719,017

15 Claims. (Cl. 179—1)

This invention relates primarily, although in its broader aspects not exclusively, to the analysis and visual representation of complex waves.

A principal object of the invention is to improve upon the method and means disclosed in my United States Patent No. 2,403,997, July 16, 1946, for providing a contemporaneous visible translation of applied speech waves or the like.

In accordance with a feature of the invention the visual representation is generated optically on a photoluminescent surface that is moved continuously in such manner that the visual representation appears to flow uninterruptedly across the observer's field of view.

Another feature of the invention is an electro-optical stylus for marking on a photoluminescent surface and adapted for high speed movement relative thereto.

Still another feature of the invention is a lamp that is energized selectively according to the frequency of current supplied thereto.

In embodiments of the invention hereinafter to be described in detail, successive positions across an endless continuously driven belt having a photoluminiscent surface are assigned to corresponding different frequency bands represented in complex waves that are to be displayed. An electro-optical system under the control of a frequency analyzer that operates on the complex waves continuously generates a luminous pattern on the moving belt, the brightness of the pattern at any particular point being indicative of the strength at a particular moment of the wave content of a particular frequency band. In certain embodiments the pattern is generated by a beam of light the brightness of which is controlled by the different frequency components in continually repeated succession while the beam moves synchronously to the corresponding different frequency positions crosswise of the belt. In other embodiments the various frequency bands are associated with individually corresponding light sources which are fixedly arrayed across the moving belt and which are independently varied in brightness under the control of the wave content of the several bands.

The nature of the present invention and its various objects, features and advantages will appear more fully on consideration of the embodiments illustrated in the accompanying drawings and hereinafter to be described.

In the drawings:

Figs. 1, 2, 3, 5 and 6 illustrate visual translating systems in accordance with the invention;

Fig. 2A illustrates a detail of the Fig. 2 system;

Fig. 3A illustrates a detail of the Fig. 3 system; and

Fig. 4 shows a modification of a detail of the Fig. 5 system.

The system illustrated diagrammatically in Fig. 1 comprises a microphone circuit 1 from which are received the speech-bearing waves or other complex waves that are to be displayed, a heterodyne frequency analyzer which cyclically scans the received band of waves many times a second, and an electro-optical system including an endless, continuously driven belt 2 that has a phosphorescent external surface on which the visual representation of the received waves is made to appear.

The frequency analyzer in Fig. 1 comprises a modulator 3 to which the received complex waves are applied concurrently with beating oscillations derived from a variable frequency oscillator 4. The operating frequency of the latter is controlled by a variable condenser 5 which is continuously driven between maximum and minimum values of capacitance by a motor 6. As a result of the variations in the beating frequency, the applied complex waves appear at the output terminals of modulator 3 in the form of a sideband the frequency position of which shifts continuously in synchronism with the change in capacitance of condenser 5. A band-pass filter 7 to which the wave output of modulator 3 is applied virtually scans the sideband and selectively transmits in succession all of the different components of the applied waves, these components being caused to fall successively within the filter transmission band. The strength of the electrical effect delivered at the output terminals of filter 7 at any instant, it will be understood, is indicative of the strength of the wave components, if any, that appear at that instant within a predetermined part of the frequency range occupied by the applied complex waves.

Following the filter 7 in circuit sequence is an optical detector or rectifier 8 the electrical output of which varies in strength in conformity with the variations in strength, or more particularly with the variations in envelope amplitude, of the waves applied to it. This is followed by an amplifier 9 the output circuit of which is electrically connected to the electrodes 10 of a gas-filled glow lamp 11. The brightness of the lamp varies in substantial conformity with the variations in the strength of the electrical output of amplifier 9, hence its brightness at any instant is indicative of the strength of the particular wave component being selected by the analyzer element at that instant.

Lamp 11 is disposed longitudinally within a drum 12 the cylindrical wall of which is opaque except for a helical slit 13. Cooperating therewith is a mask 14 which contains a slit 15 that extends longitudinally of the drum 12 and parallel to the elongated lamp 11. Belt 2 is drawn past the slit 15 so that light reaches the external surface of the belt substantially only at the point of intersection of the two slits 13 and 15. This point of intersection, it will be understood, moves across the belt repeatedly in synchronism with the repeated excursions in the frequency of the beating oscillations. In view of the relations described, the different positions of the aforesaid point of intersection and the corresponding different underlying portions of the belt 2 are individual to corresponding different frequency bands represented in the applied complex waves.

During a given excursion of the frequency of beating oscillator 4 a spot of light will move rapidly and synchronously across the belt 2, the brightness of the light varying in conformity with the varying strength of the wave output of filter 7. With the belt moving relatively slowly the luminous line or strip resulting from the movement of the spot will lie at substantially right angles to the direction of movement or length of the belt. On succeeding excursions of the beating frequency corresponding luminous lines or strips are generated on the belt, all lying in registry with each other and each substantially contiguous to the next so that one dimension of the resulting pattern, corresponding to the width of the belt, has the sense of a frequency scale, and the other dimension has the sense of a time scale.

The luminous patterns formed on the belt 2 appear to an observer to flow uninterruptedly across the field of view. After leaving the field of view the pattern fades and disappears before the slit 15 is again reached, and the fading may be accelerated by infra-red radiation if necessary. The belt may be of plastic material and have the phosphorescent substance embedded in its outer surface or held thereon by plastic lacquer. The rate at which the belt is driven may be set to suit the particular observer, within limits, and the speed of motor 6 may likewise be fixed or adjusted to suit the observer or to obtain a desired degree of resolution in the time dimension. The band width of filter 7 likewise may be made adjustable within wide limits to permit different degrees of frequency resolution as desired. Where speech waves are to be represented on the screen, for purposes of voice culture or the like, the band width may be made somewhat greater than the fundamental voice frequency, or 300 cycles for specific example, so that the vocal resonances may be seen without unnecessary detail of harmonic structure.

In the modification of the Fig. 1 system that is illustrated diagrammatically in Fig. 2, the heterodyne frequency analyzer of the former is replaced by a relatively simple tunable circuit comprising the motor driven variable condenser 5 and a concurrently variable inductance element so arranged that the inductance thereof changes in the same sense as the capacitance of condenser 5.

The inductance element in Fig. 2 comprises a U-shaped core 23 of soft iron or the like and a rotatable armature 24 of soft iron disposed in the air-gap at the open end of the core. The armature 24, which is driven in synchronism with condenser 5, and the juxtaposed portions of the core 23 are so shaped as to provide a cyclical variation in the reluctance of the magnetic circuit as the element 24 rotates. Microphone circuit 1 is connected to a first coil 25 that is wound upon the core 23, and a second coil 26, also on core 23, is connected through a fixed condenser 27 to the respective terminals of condenser 5, the latter terminals in turn being connected to the input terminals of amplifier 9. Condensers 5 and 27 are so proportioned with reference to the characteristics of the inductance element that the tuning of the elements interposed between circuit 1 and amplifier 9 varies periodically back and forth across the frequency range occupied by the applied wave.

The wave output of amplifier 9 in Fig. 2 is delivered over a circuit 28 to the lamp 11 which is thereby caused to vary in brightness in the manner described with reference to Fig. 1.

Fig. 2 illustrates also a modified arrangement for exposing the phosphorescent belt 2 to lamp 11, and an arrangement of the associated elements that makes for compactness and portability. Thus, an elongated chamber 30 that is roughly C-shaped encloses the belt 2 except for a portion thereof that appears in the opening of the C. By suitable proportioning of the other parts hereinbefore mentioned, these parts may be housed within the chamber 30, and the latter may be supplemented to form a case enclosing and protecting all of the operating elements of the system.

As illustrated in Fig. 2A, the lamp 11 is disposed in one end of the chamber 30 together with a lens 31 so positioned that light emanating from lamp 11 is directed to and reflected from a reflecting surface 32 within the chamber 30 and brought to a focus along a slit 15 in chamber wall 33. Past slit 15 runs the belt 2. An endless belt 34 of opaque material passes at right angles to the direction of movement of belt 2 between the latter and the wall portion 33. Belt 34 is driven from motor 6 and has at least one aperture 35 therein which moves lengthwise of the slit 15 to allow successively different portions of the belt 2 crosswise thereof to be illuminated by lamp 11. The position and rate of movement of the opening 35 are so chosen that each time the tuning of the analyzer circuit sweeps from one extremity to the other of the frequency range, the opening 35, or one such opening, moves synchronously from one extremity to the other of the slit 15.

It will be understood then that in the Fig. 2 system a luminous pattern is generated on the belt 2 opposite slit 15 and continuously drawn across the observer's field of view substantially as described with reference to Fig. 1.

Fig. 3 illustrates a further modification of the Fig. 1 system in which a flashing lamp 41 corresponding to the lamp 11 of preceding figures is associated with a moving optical guide that conveys the light to different points on belt 2 in the desired manner. The optical guide may comprise a mass of a material such as Lucite having a high index of refraction. As shown, it has a body portion 42 that encloses the lamp 41 and a slender tapering extension portion or neck 43. The latter has a curved end 44 that is directed toward and rides over a substantially flat portion of the belt 2. Contributing to the efficient transfer of light is a light reflecting coating 45 of metal on the optical guide, and a lens 46 which is disposed interiorly of the guide in a position to direct light into the extension portion 43. Lamp 41 and lens 46 may be embedded in the material comprising portion 42 or the latter may be recessed to accommodate them so that they do not add to the mass of the guide itself. The latter construction is illustrated in Fig. 3A which will serve also to show further details suitable for the Fig. 3 structure. As illustrated, the guide is pivoted at a suitable point such as to allow the end 44 to swing freely back and forth across the belt 2.

The Fig. 3 system comprises further a magnetic vibrator that has an approximately U-shaped magnetic core 51, an exciting winding 52 wound thereon and energized from an alternating current source 53, and a flexible armature or reed 54 of magnetic material. The latter is attached at its left-hand end to one extremity of the core 51 and in the other direction it extends across, and is slightly spaced from, the other extremity of the core 51. It is thereby caused to vibrate under control of the applied alternating current. At its other or free end the reed 54 fits snugly into a notch 55 in element 42 so that as the reed vibrates the light guide oscillates about its pivot point and the optical stylus 44 sweeps back and forth across belt 2.

The microphone circuit 1 which leads to amplifier 9 in Fig. 3 is continuously varied in tuning in synchronism with the excursions of the stylus 44 so that each position of the stylus is identified with a particular part of the frequency range. One of the tuning elements is a shunt condenser which comprises a metal plate 56 as one element and a juxtaposed portion of the vibrating reed 54 as the other element. The capacitance of the condenser so formed depends on the spacing or gap between elements 54 and 56 and it is evident that this spacing varies periodically in synchronism with, and as a result of the vibration of reed 54. The other tuning element associated with circuit 1 is a continuously variable shunt inductance comprising a coil 26 that is wound on a substantially U-shaped core 57. The latter is joined to core 51 to form a composite substantially C-shaped core with the reed 54 passing through the opening therein. The movement of reed 54 changes the reluctance of the magnetic circuit associated with winding 26 and thereby changes the inductance concurrently with and in the same sense as the changes in the capacitance of the condenser. Although the microphone circuit 1 might be inductively coupled through coil 26, to amplifier 9, as in Fig. 2 the arrangement for direct connection provided in Fig. 3 affords a coupling that is independent of the variations in inductance of coil 26.

The simiplicity of the Fig. 3 system in both its mechanical and its electrical aspects will be evident. The magnetic vibrator may be made quite rugged and dependable. The construction also reduces to a minimum the problem of maintaining synchronism between the tuning of the frequency analyzer element and the mechanical movement of the optical scanner. Inasmuch as the source 53 may be a commercial 60-cycle power source, for example, which may be used also to supply the operating power required for amplifier 9, this embodiment is especially well adapted for a compact portable instrument. Optionally, the source 53 may supply current of a much lower frequency, such as only a few cycles per second, or even less, to avoid unduly rapid reciprocation of the light guide. In the case of received speech waves, however, too low a frequency will fail to develop the luminous patterns in sufficient detail to distinguish the different speech sounds.

Referring to Fig. 4 there is illustrated schematically an arrangement that may be regarded as comprising a tuned or frequency selective lamp. Similar lamps are incorporated in the wave analyzer and display system to be described hereinafter with reference to Fig. 5. Within an elongated vacuum-tight glass envelope 60 shown in Fig. 4 is a longitudinally disposed reed 61 of magnetic material, iron, for example, which is supported at one end only so that it is free to vibrate. At its fixed end the reed 61 is electrically and mechanically attached to a leading-in conductor 62. Into the other end of the vessel 60 there extends a leading-in conductor 63 which may be tubular as shown and which either constitutes or provides a support for an electrode 64. The latter is disposed in longitudinally overlapping relation with the free end of reed 61 and spaced therefrom in the plane of vibration as that its separation from the reed 61 varies as the reed vibrates. The electrode 64 may be made electron emissive. Further, there may be an electrical heater element 65 disposed within the electrode 64 to promote electron emission, the heater element being supplied with heating current from a battery or other source 66 by means of a circuit comprising the tubular conductor 63 and a wire conductor 67 enclosed thereby. If desired, an electrode of copper or other suitable material may be attached to the free end of reed 61.

Another electrical source, such as a battery or alternating current generator 68, is connected across the conductors 62 and 63 through a resistance 69 which may be adjusted to the most favorable resistance value. The source 68 tends to establish an electrical discharge across the gap separating the free end of reed 61 and electrode 64 but the voltage of the source is so adjusted that with the reed 61 at rest no discharge occurs. The envelope 60 may contain a gas such as neon or argon, or both, under low pressure so that if and when a discharge occurs the discharge will be luminous. Mounted directly outside the envelope 60 in a position to cause deflection of the reed 61 is an electromagnet comprising a coil 71 wound on a magnetic core 72. Alternating current of any frequency supplied to the terminals 73 of coil 71 will tend to cause corresponding forced vibration of the reed 61, but applied current of a frequency corresponding to the natural vibration frequency of reed 61 will produce relatively strong vibration. In either circumstance the gap between the electrode 64 and reed 61, the latter serving also as an electrode, may be momentarily or intermittently so reduced that a luminous discharge is established. The intensity or brightness of the discharge will depend on the strength of the vibrations and therefore also on both the strength of the current supplied to coil 71 and the relation between the frequency of that current and the natural frequency of vibration of the reed 61.

The tuned lamp is thus much more sensitive to current of one frequency than to current of another frequency; if the two currents are of about equal strength it can be made to light when one is applied and not when the other is applied. A similar frequency selective response can be expected when the current supplied to coil 71 is complex in character. Thus the strength of the complex current may be continuously maintained at a constant value insufficient to cause the lamp to light unless the current includes a component having the particular frequency to which reed 61 is sensitive.

The current supplied by source 68, if it be alternating current, may have a frequency ranging from many times lower to many times higher than the vibration frequency of reed 61. Further, the various parts may be so proportioned with reference to the frequency of source 68 that the discharge, once established, persists through at least several cycles of vibration of reed 61 within any given half cycle of the source 68. Alternatively the parts may be so proportioned that the discharge, if established during any given period of vibration of the reed 61, is thereafter extinguished in the same period irrespective of the instantaneous amplitude of the voltage supplied by source 68.

For the purposes of Fig. 4 the aforesaid proportions are preferably such that the discharge arc is extinguished within an interval that is short compared with the syllabic cycle in speech, for example, one-sixtieth of a second.

Referring now to Fig. 5, there is shown diagrammatically a visual translating system, in accordance with the invention, of the type described employing a uniformly moving endless belt 2 of luminescent material in which, however, a multiplicity of optical marking elements are arrayed across the belt 2 and controlled individually by the wave energy in respectively different parts of the frequency range. In the preferred form the marking elements comprise, as shown, a multiplicity of tuned lamps having a common envelope and constructed in accordance with principles described with reference to Fig. 4.

The lamp structure in Fig. 5 is elongated and of approximately rectangular cross-section. One of the longer walls 79 is of metal and on its inner face is a longitudinal slot in which are rigidly embedded the ends of a multiplicity of tuned reeds 61. The latter are spaced close together and are assigned progressively different natural vibration frequencies extending over the frequency range to be examined. For this purpose the reeds may vary progressively in length or thickness or composition or in more than one of these respects. The free ends of the reeds 61 are aligned with each other in proximity to a transparent face 82 of the envelope in juxtaposed relation with a common cathode strip 83. The latter is heated throughout its length by means of a filamentary heater 84 which is supplied with heating current from an external battery 86 and which is embedded in a strip of insulating material 85.

Source 68 is coupled on the one hand to the cathode 83 and on the other hand to the fixed end of all of the reeds 61 to produce a luminous discharge between the cathode 83 and the free end when the latter are sufficiently deflected toward the cathode 83.

Beneath the lower face of the envelope, and in a position to affect all of the reeds 61, is an electromagnet of elongated cross-section comprising a magnetic core 72 having an operating winding 71 thereon. The waves to be analyzed are transmitted from microphone circuit 1 through amplifier 9 and impressed on winding 71.

Interposed between the belt 2 and the transparent face 82 of the envelope is a mask 14 having a longitudinal slit 15 therein and a cooperating lens 31 by means of which the light from the various luminous discharges is concentrated in a fine line extending across the belt 2.

In the operation of the Fig. 5 system, the complex wave applied to winding 71 tends to set all of the reeds 61 into vibration, but the only reeds that are set into substantial vibration are those having a natural frequency or frequencies approximately coinciding with the frequency of the various components represented in the complex wave. If and when the vibration of a given reed becomes strong enough, i. e., when the corresponding frequency component is of sufficient strength, a luminous discharge is established at the free end of the reed and the juxtaposed portion of belt 2 is correspondingly illuminated through slit 15. As the strength of the component and also the strength of vibration varies, the intensity of the illumination of the belt 2 likewise is varied, thereby leaving a luminous track of variable brightness on the moving belt. The rate of movement of the belt will ordinarily be slow enough that variations in brightness of illumination occurring at the vibration frequency will not appear in the luminous track.

The upper and lower or wider faces of the envelope, if made of transparent material as indicated, may be covered or opaqued to facilitate observation of the patterns which are formed on the mere face of belt 2. In view of the closeness with which the vibrating reeds 61 may be spaced, thin vertical plates 87 of insulating material may be provided as shown to prevent the discharge at the end of one reed from spreading to adjacent reeds. Mica separators may be used for this purpose. Each separator may be designed also to reduce or prevent the spreading of light from one discharge to portions of belt 2 that are associated with other reeds. Amplifier 9 may be regulated and equalized with a view to insuring that strong components and weak components are both adequately represented in the luminous pattern. The latter, it will be understood, is similar in character to that produced in the other systems described herein.

Fig. 6 illustrates schematically a further embodiment of the invention, closely related to the one shown in Fig. 5, in which a bank of tuned circuits or band-pass filters 90, connected to receive the complex waves from amplifier 9 and adapted to transmit wave components in respectively different parts of the frequency band, takes the place of the magnetic-reed frequency analyzer of Fig. 6. A multiplicity of minute incandescent or glow discharge lamps 91, such as the so-called "grain-of-wheat" lamps, are fixedly positioned side by side, and shielded from each other, in a row extending across the luminous belt 2. The lamps 91 are lighted to varying degrees by the output wave energy from respectively corresponding filters 90, and they are preferably biased to a point just below luminosity.

Although the present invention has been described largely with reference to several specific embodiments thereof, it will be understood that the invention may be embodied in other forms within the spirit and scope of the appended claims.

What is claimed is:

1. In combination, an element having a luminescent surface movable continuously relatively to and transversely of a line extending across the said surface, a multiplicity of light sources, means for directing the light from the several said sources to respectively corresponding parts of said line whereby the light from each of said sources tends to produce a luminous track on the moving luminescent surface, a multiplicity of frequency selective elements responsive to applied waves, said last-mentioned elements being differently responsive to wave energy components in corresponding different parts of the wave frequency range, and means including said selective elements for varying the luminosity of each track under the control of the wave energy components appearing in the corresponding part of the frequency range.

2. The method of translating applied waves into the form of a pattern on a photo-luminescent surface, which includes the steps of distinguishing the various frequency components present in said waves, exposing the said surface to electromagnetic wave radiation along a line extending across the said surface, continually varying the amount of radiation from one to another of different points along said line in correlation with the variations in strength from one to another of corresponding different frequency components whereby the luminosity of said surface along said line is correspondingly varied, and continually moving said surface relative to said line in a direction transverse to that of said line.

3. In combination, a multiplicity of light sources closely adjacent to each other and in alignment, a continuously driven element having a luminescent surface movable past the said aligned light sources and exposed to light rays emanating therefrom, a source of electrical waves, and a multiplicity of frequency selective elements associated with individually corresponding ones of said light sources for varying the exposure of said luminescent surface, said frequency selective elements having mutually different frequency selective characteristics and being responsive to corresponding different frequency components appearing in the waves from said source.

4. In combination, a luminous discharge device comprising a gas-tight light-transmitting envelope, a vibratile member of magnetic material mounted within said envelope, and a pair of cooperating space discharge electrodes, one of said pair of electrodes being attached to said vibratile member, and an electromagnet in a position to cause vibration of said member under the influence of current supplied to the electromagnet.

5. In combination, a luminous discharge device comprising a gas-tight envelope at least a portion of which is transparent, a multiplicity of vibratile members of magnetic material mounted within said envelope, said vibratile members having mutually different natural periods of vibration, individual electrodes carried by the several said vibratile members, and a multiplicity of stationary electrodes each spaced from and juxtaposed to a corresponding one of said first-mentioned electrodes, and an electromagnet positioned to magnetically control the movement of said vibratile members.

6. In combination, a multiplicity of vibratile reeds of magnetic material mounted with their free ends closely adjacent to each other and in alignment, said reeds having progressively different natural periods of vibration, electrode means spaced from and adjacent to the said free ends, a current source electrically connected between said reeds and said electrode means adapted to establish a space discharge between the said electrode means and any of said free ends depending on the deflection of the corresponding reeds, electromagnet means positioned to cause deflection of said reeds, and a source of electrical waves connected to energize said electromagnet means.

7. In combination, a multiplicity of vibratile reeds of magnetic material mounted with their free ends closely adjacent to each other and in alignment, said reeds having progressively different natural periods of vibration, electrode means spaced from and adjacent to the said free ends, a current source electrically connected between said reeds and said electrode means adapted to establish a space discharge between the said electrode means and any of said free ends depending on the deflection of the corresponding reeds, electromagnet means positioned to cause deflection of said reeds, and a source of electrical waves connected to energize said electromagnet means, and a continuously driven element having a luminescent surface movable past the said aligned free ends and exposed to electromagnetic rays emanating from the space discharges at said free ends.

8. In combination, a mass of transparent material having a body portion and neck portion, a source of light positioned within said body portion, at least said body portion having a light reflecting surface whereby light from said source is directed into said neck portion and radiated from the end thereof, and a pivotal support for said body portion.

9. In combination, a substantially solid mass of transparent material having a body portion and an elongated neck portion, a light reflecting coating on said body and neck portions, an electric lamp within said body portion, the end of said neck portion being free to radiate light conducted thereto from said lamp, and driving means for oscillating said mass about an axis in said body portion whereby the radiating end of said neck portion is caused to oscillate.

10. A combination in accordance with claim 9 including an element having a luminescent surface positioned to receive light radiated from said neck portion, and means for moving said surface in a direction transverse to the path of oscillation of the said end of the neck portion.

11. A combination in accordance with claim 9 in which said driving means comprises an electromechanical vibrator having a vibrating armature that engages the said body portion.

12. A combination in accordance with claim 9 comprising a core of magnetic material having an air gap therein, an armature fixed to said core at an intermediate point thereof and extending through said air gap, electric circuit means including a first winding on said core for causing said armature to vibrate, a tuned circuit comprising a second winding on a different part of said core, and circuit means including said tuned circuit for controlling the supply of current to light said lamp, said armature engaging said body portion to constitute said driving means.

13. The method of representing complex waves in a pattern on a photo-luminescent surface which comprises distinguishing the various frequency components present in said waves, exposing said surface to light waves along a line extending across said surface, continually varying the intensity of the light waves from one to another of different points along said line in correlation with the variations in strength from one to another of corresponding different frequency components, whereby the luminosity of said surface along said line is correspondingly varied, and continually moving said surface relative to said line in a direction transverse to that of said line.

14. In combination, a signal wave source, a photo-luminescent surface, means for distinguishing the various frequency components present in the waves supplied by said source, means for exposing said surface to electromagnetic wave radiation along a line extending across the said surface, means for continually varying the amount of the radiation from one to another of different points along the line in correlation with the variations in strength from one to another of corresponding different frequency components, whereby the luminosity of said surface along the line is correspondingly varied, and means for continually moving said surface relative to the line in a direction transverse to that of the line.

15. In combination, a source of complex waves, a photo-luminescent surface, means for distinguishing the various frequency components present in the waves supplied by said source, means for exposing said surface to light waves along a line extending across the said surface, means for continually varying the intensity of the light waves from one to another of different points along said line in correlation with the variations in strength from one to another of corresponding different frequency components, whereby the luminosity of said surface along the line is correspondingly varied, and means for continually moving said surface relative to the line in a direction transverse to that of the line.

RALPH K. POTTER.

REFERENCES CITED

The following references are of record in the file of this patent:

UNITED STATES PATENTS

| Number | Name | Date |
| --- | --- | --- |
| 2,403,997 | Potter | July 16, 1946 |